FLUID PULSE WIDTH MODULATION

Filed Sept. 30, 1963 4 Sheets-Sheet 1

INVENTORS,
RAYMOND W. WARREN
ELMER L. SWARTZ

BY Harry M. Saragovitz,
Edward J. Kelly
Herbert Berl & J. P. Edgerton

INVENTORS,
RAYMOND W. WARREN
ELMER L. SWARTZ
BY Harry M. Saragovitz,
Edward J. Kelly,
Herbert Berl & J. P. Edgerton INVENTORS,
RAYMOND W. WARREN
ELMER L. SWARTZ
BY Harry M. Saragovitz, Edward J. Kelly, Herbert Berl & J. P. Edgerton INVENTORS,
RAYMOND W. WARREN
ELMER L. SWARTZ
BY Harry M. Saragovitz,
Edward J. Kelly,
Herbert Berl & J. P. Edgerton United States Patent Office 3,228,410

Patented Jan. 11, 1966

3,228,410
FLUID PULSE WIDTH MODULATION

Raymond W. Warren, McLean, and Elmer L. Swartz, Falls Church, Va., assignors to the United States of America as represented by the Secretary of the Army Filed Sept. 30, 1963, Ser. No. 312,808
11 Claims. (Cl. 137—81.5)
(Granted under Title 35, U.S. Code (1952), sec. 266)

The invention described herein may be manufactured and used by or for the Government of the United States of America for governmental purposes without the payment to us of any royalty thereon.

This invention relates generally to fluid amplifiers and, more particularly, to fluid pulse modulators.

In the development of fluid systems made up of fluid elements, a need arose for a pulse width modulator. This invention presents such a novel device capable of changing analog control signals to digital outputs wherein the magnitude and duration of the analog input signals control the duration of the corresponding digital output signals. This produces an amplified digital output the energy of which is proportional to the analog input. With this invention, it is possible to convert analog signals to digital form, transmit the analog information in digital form and achieve an oscillating digital output the energy of which is proportional to the energy of the analog signal input. Further, the pulse modulator of this invention lends itself to several modifications wherein precise predetermined control can be provided. For example, a buffer amplifier can be added to improve frequency stability. Also, a digital frequency change can be produced that is proportional to control flow.

It is, therefore, an object of this invention to provide a fluid system capable of pulse width modulation.

Another object of this invention is to provide a fluid pulse width modulation with precise control.

Still another object of this invention is to provide a novel analog to digital converter.

A further object of this invention is to provide a precisely controlled fluid pulse modulator.

A still further object of this invention is to provide a fluid pulse width modulator in which the energy of the digital output is proportional to the energy of an analog signal input.

Another object of this invention is to provide a digital frequency change in the output of a fluid amplifier which is proportional to an analog control flow.

These and other objects, aspects, uses and advantages thereof, will clearly appear from the following description and from the accompanying drawing, in which.

Briefly, this invention includes a fluid oscillator for establishing a fixed frequency of oscillation of a digital pulse output element such as a bistable fluid amplifier, and combines fluid analog input signals with the oscillator signals to produce pulse width modulation of the digital output. Capacitive properties of the system are utilized to effect a usable presentation of the analog signals.

The fluid elements of this invention are constructed in layers etched out, drilled out or otherwise formed to provide appropriate channels which are sealed from the outside except at the inputs and outputs. The material may be of plastic, such as Lucite, or metal, such as aluminum or brass or any other material which is compatible in strength and chemistry with the fluid flowing through the channels. This fluid can be air, water, acid, and the like.

Figure 1:
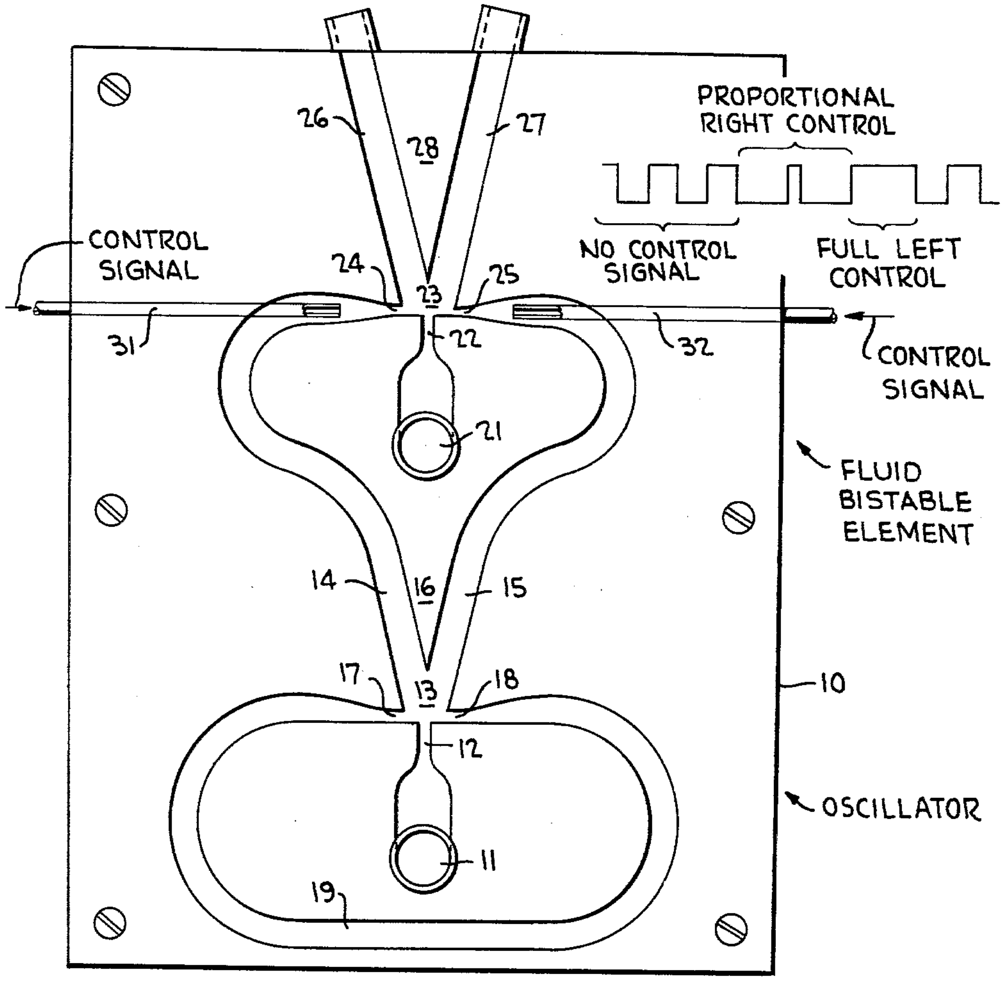
FIG. 1 is a pictorial showing of a first embodiment of a pulse width modulator.

FIG. 1 shows a fluid pulse width control element 10 with an opening 11 in the upper surface which is connected to a fluid power source, not shown. This source is supplied to oscillator power nozzle 12 and is directed into an interaction chamber 13 into which are also directed a pair of receivers 14 and 15. Separating the receivers is a divider 16 which is symmetrically aligned with the center line of power nozzle 12, the receivers and divider converging towards the interaction chamber. A left control nozzle 17 and a right control nozzle 18 are axially aligned and oppositely directed into the interaction chamber 13. Control nozzles 17 and 18 are connected by a channel 19 which carries the control fluid waves from one control nozzle to the other in alteration to effect oscillation of the fluid power stream from nozzle 12 into receiver 14 and receiver 15. The operation and structure of this oscillator is more fully disclosed in U.S. Patent 3,016,066 issued January 9, 1962, to Raymond W. Warren, one of the instant inventors.

A second opening 21 for connection to the fluid power source is provided whereby a fluid stream is directed from a power nozzle 22 in a fluid bistable element. The fluid stream is directed by power nozzle 22 into an interaction chamber 23. A left control nozzle 24 is directed into the interaction chamber 23 and a right control nozzle 25 is also directed into the interaction chamber 23. The two control nozzles are axially aligned with respect to each other and are perpendicular to the power nozzle 22.

The left receiver 14 of the oscillator is connected to the left control nozzle 24 of the bistable element and, likewise, the right receiver 15 is connected to the right control nozzle 25 thereof.

The bistable element has a left receiver 26 and a right receiver 27 separated by a divider 28 converging toward said interaction chamber.

Inserted within the left control channel of the bistable element is a left analog control signal input tube 31 directed so as to augment the fluid flow through left control nozzle 24. Also, inserted within the right control channel of the bistable element is a right analog control signal input 32 directed so as to augment the fluid flow through right control nozzle 25.

Figure 2:
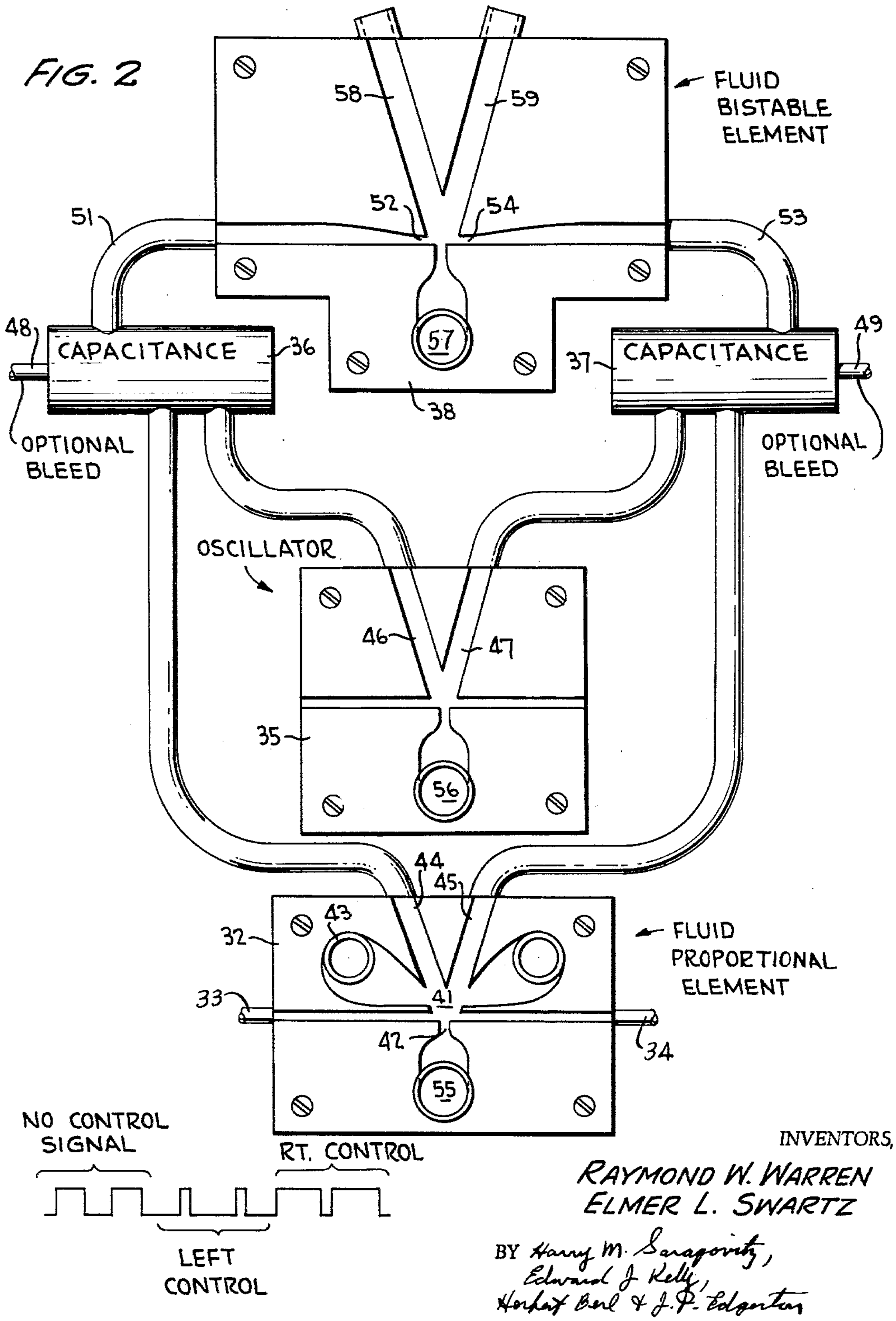
FIG. 2 is a pictorial showing of a second embodiment of a pulse width modulator.

The fluid pulse width modulator system shown in FIG. 2 includes a proportional amplifier such as is more fully described in the U.S. Patent No. 3,122,165 issued to Billy M. Horton for Fluid Operated System. The system of FIG. 2 further includes an open end organ pipe oscillator 35 as disclosed in the copending application of Raymond W. Warren, one of the instant inventors, Serial No. 300,709 filed August 7, 1963 for Multi-Divider Fluid Elements. Also included are a pair of capacitors 36 and 37 and a bistable element 38 like the bistable element of FIG. 1.

The organ pipe oscillator 35 provides time base signals alternately to each of the pair of capacitors where the analog controlled signals are mixed with the time base signals. The outputs of the capacitors are applied as the inputs to the bistable element to give the digital output signals.

The analog control signals, from sources not shown, are applied into the interaction chamber 41 of the proportional amplifier 32 perpendicular to the power stream nozzle 42. The receivers 44 and 45 selectively receive the power stream from nozzle 42 under control of analog signals in tubes 33 and 34 and the vent means 43.

Left receiver 44 is connected to left capacitor 36 and right receiver 45 is connected to right capacitor 37.

In the open end organ pipe oscillator 35, left receiver 46 is connected to left capacitor 36 and right receiver 47 is connected to right capacitor 37.

Left capacitor 36 is provided with a breather hole 48 and right capacitor 37 is provided with a breather hole 49 by which the effective capacitance of the volume can be increased.

The output 51 of capacitor 36 is connected to left control nozzle 52 in the bistable element 38 and the output 53 of the right capacitor 37 is connected to the right control nozzle 54 of the bistable element 38. Openings 55 in the proportional amplifier 32, 56 in the organ pipe oscillator and 57 in the bistable element provide the openings whereby a fluid power source, not shown, is supplied to the respective power nozzles. The receivers 58 and 59 in the bistable element supply the digital output of the fluid pulse modulator of FIG. 2.

Figure 3:
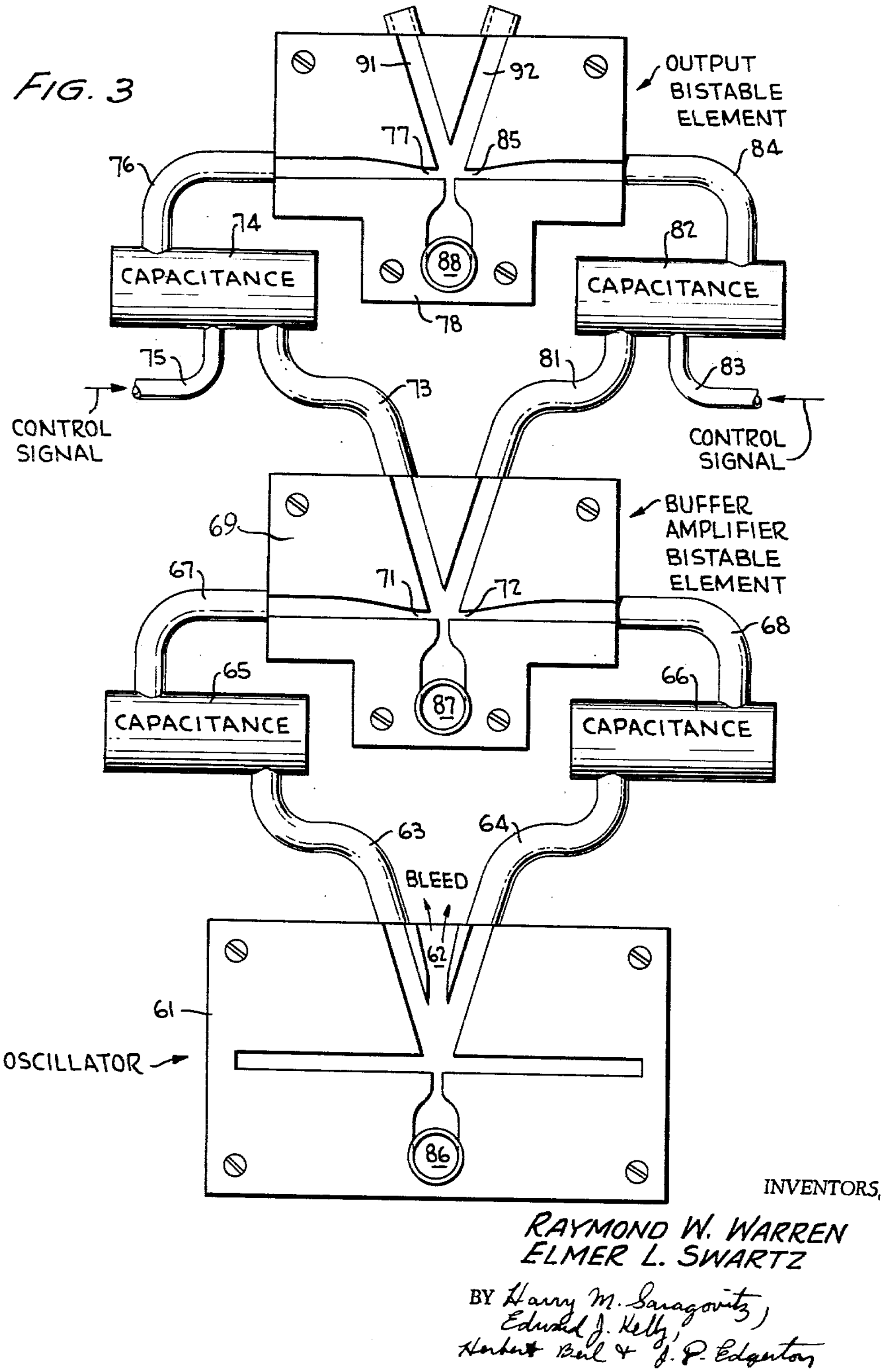
FIG. 3 is a pictorial showing of a third embodiment of a pulse width modulator.

FIG. 3 shows a proportional modulation digital pulse width system. Included are: a closed end organ pipe oscillator 61 disclosed and described more fully in the Multi-Divider Fluid Elements application set forth above. A central breather aperture 62 is provided to permit impedance matching with succeeding elements. The left output 63 of the oscillator 61 is connected as the input to a left capacitor 65 and the right output 64 is connected as an input to a right capacitor 66. The output of left capacitor 65 is connected through tube 67 into a buffer amplifier 69 at its left control nozzle 71. The output of right capacitor 66 is connected through tube 68 to the right control nozzle 72. The left output of buffer amplifier 69 is supplied through tube 73 to a second left capacitor 74 into which is also supplied the analog input signals through left tube 75. The output of capacitor 74 is supplied through tube 76 to the left control nozzle 77 of bistable element 78. The right output of the buffer amplifier 69 is supplied through connector 81 to a second right capacitor 82 into which is also supplied the analog input signals through right tube 83. The output of capacitor 82 is connected through connector 84 to the right control nozzle 85 of the bistable element 78. Opening 86 in the organ pipe oscillator 61, opening 87 in the buffer amplifier 69, and opening 88 in the bistable element 78 are provided for the connection to the fluid power source, not shown, which supplies the fluid streams through the respective power nozzles. The receivers 91 and 92 of the bistable element 78 provide the digital output for the system.

Figures 4, 5:
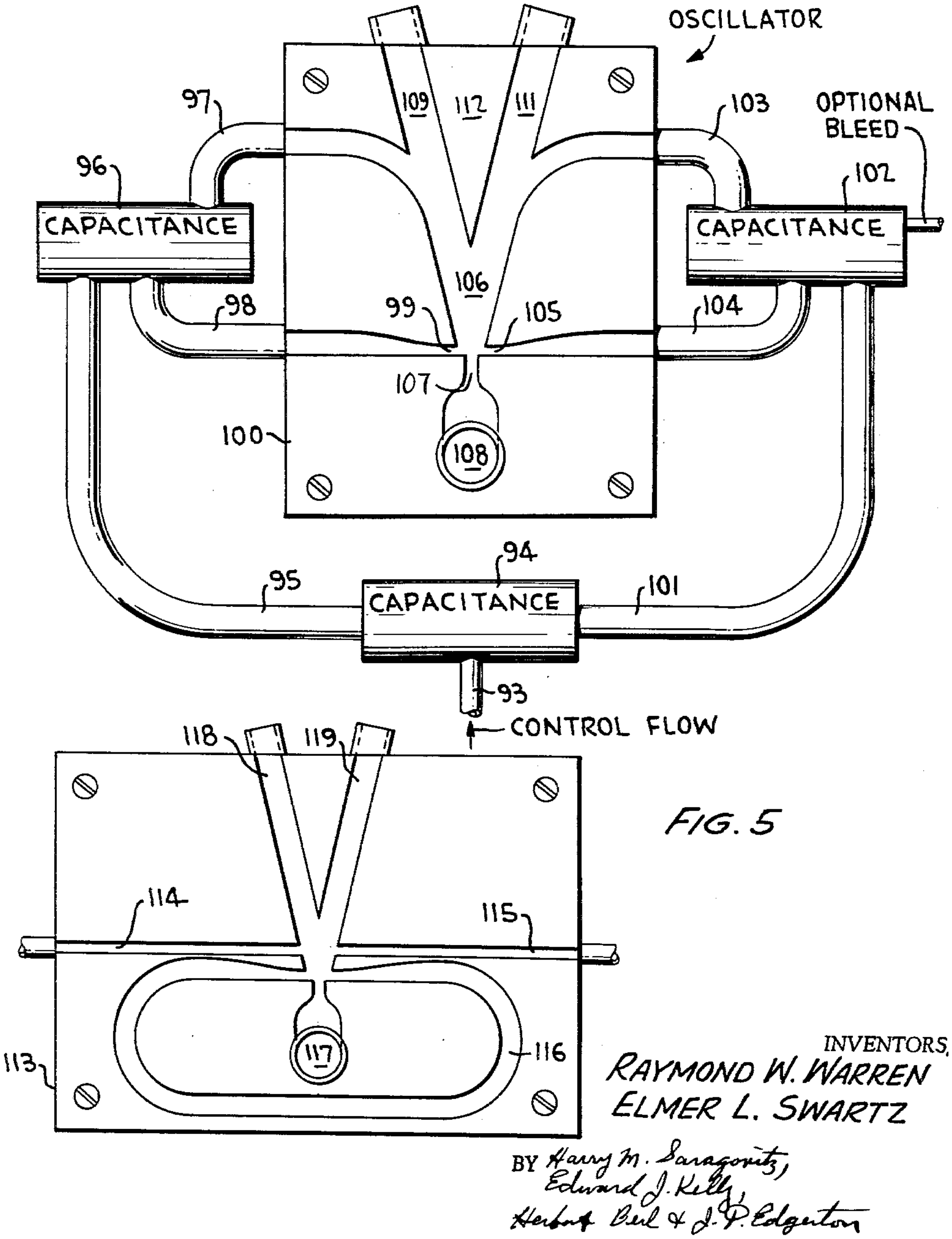
FIG. 4 is a pictorial showing of a digital device wherein the output frequency is proportional to an analog control flow.
FIG. 5 is a pictorial showing of a fourth embodiment of a pulse width modulator.

FIG. 4 shows a system in which the digital output frequency changes proportionally to the analog control flow. The analog input is supplied from a source not shown through tube 93 into a central capacitor 94. A left output of capacitor 94 is connected through conductor 95 to a left capacitor 96 into which is also supplied a feedback signal through conductor 97. The output of capacitor 96 is supplied through conductor 98 to the left control nozzle 99 in bistable element 100. A right output of capacitor 94 is connected through conductor 101 to a right capacitor 102 into which is also supplied a feedback signal through conductor 103. The output of capacitor 102 is supplied through conductor 104 to the right control nozzle 105 of the bistable element 100.

The interaction chamber 106 of bistable element 100 is bounded by the control nozzles 99 and 105, a power nozzle 107 which is supplied by a fluid power source not shown through opening 108 in the top surface, and lock-on wall surfaces, feedback openings, and receiver means 109 and 111 separated by a divider 112. The digital output frequency is available at the outlet of receiver 109 or 111.

FIG. 5 shows a simplified system for pulse width modulation in which an oscillator 113 like the oscillator in FIG. 1 is supplied with the analog control tubes 114 and 115 connected immediately downstream of the oscillator pulsing and time delay loop 116. The capacitance for the system is within the separation bubble which extends over the control opening and the analog input opening on each lock-on side. The power source is supplied through opening 117 and the digital output is available at the outlets of left receiver 118 and right receiver 119.

In the operation of the system shown in FIG. 1, the fluid oscillator with its interaction chamber 13 provides a fixed frequency oscillation which is supplied as the control signals of the bistable element having an interaction chamber 23. Also supplied to the bistable element are the analog input control signals through tubes 31 and 32 into the control nozzles 24 and 25 of the bistable element. When no analog signal is present, the output of the bistable element through receivers 26 or 27 is as shown in the wave form. The application of an analog input signal through right tube 32 into the interaction chamber 23 provides a pulse width modulation of the output of the bistable element which is proportional to the analog input signal. In the absence of any analog input signal in either of tubes 31 or 32, the output of the system is as shown in the first part of the wave form marked No Control Signal. The presence of analog signals in right control tube 32 provides an output which is represented by the waveform section labeled Proportional Right Control. With the analog input signals applied through left control tube 31, the analog value of the input signal is indicated to be at or over the limit required to lock the power stream in the right receiver 27. This activity is represnted by the section of the wave form marked Full Left Control.

In the presence of a slowly changing analog signal input, the frequency of the oscillator can be low and provide a proportional digital output very close to the proportional change in the analog input. In the presence of rapidly changing analog signals, a very high digital frequency is necessary to provide a close approximation of the analog input. Capacitance in the separation bubble and in the lines is used to shape the oscillator signal to the bistable element. The outputs of the bistable element can be used as reaction jet or directed overboard to effect control of a missile.

If the output of a bistable element were directed in opposite directions at the blades of a reaction turbine, speed control of the reaction turbine could be obtained. The flow from a pump on the turbine whose output is proportional to the speed of the turbine would enter one of the controls, 31 for example. A bias flow to set the speed would be injected in the opposite control 32. Whenever the signals differed, there would be a proportionate change in the output of the bistable element which impinging on the reaction turbine would adjust the speed to the desired value.

In the operation of the modulator in FIG. 2, a proportional amplifier is provided into which the analog control signal inputs are effective to control the proportion of the fluid stream supplied to each receiver 44 and 45. The capacitors 36 and 37 then mix the outputs of the amplifier with the outputs of the open end organ pipe oscillator 35 to provide output signals representative of the differential in the outputs of the proportional amplifier 32. The amplified analog control signals introduced into either capacitor change the filling and emptying time of the capacitor so that the bistable element is held longer on one side than the other, thus modulating the output pulses in proportion to the control signals.

The capacitances can be equipped with an adjustable bleed. The bleed can effectively regulate the filling and emptying time of the capacitances, thus adjusting the gain of the proportional control signal. Increasing the bleed makes a value of the capacitance appear larger and provides a means of adjusting the integral of all the flows into and out of the capacitance.

When the control flow is greater than the oscillator flow, the bistable element can be driven to one side and held there giving a maximum continuous correction. In effect, this is an overload condition. As the control flow is reduced, the output will again become digital and the pulse width modulated.

If the input of the capacitance from the oscillator is located directly opposite the output of the control of the bistable element, wave and flow effects can be translated across the intervening space between the inlet and the outlet. Under these conditions the system can operate as if there is no capacitance present. For operation as described, the inlets and outlets to the capacitance should be located out of line so that there is no direct coupling between them.

In the operation of the pulse width modulator shown in FIG. 3, the flow and frequency of the oscillator and the value of the capacitance must be adjusted so that the bistable element flips within the half cycle of the oscillator.

The frequency of an oscillator can be altered by varying the back pressure on the outlet. If it is desired that the frequency remain constant while varying control flows and pressures are introduced into the capacitance, a buffer amplifier can be introduced between the oscillator and the varying load as shown in FIG. 3. The buffer amplifier serves to isolate the oscillator. The operation of the device from the buffer amplifier to the bistable element is the same as in the equivalent structure in FIG. 2.

In the operation of the device in FIG. 4, with a constant quantity of control flow such as from the feedback tubes 97 and 103, the time to switch an element can be changed by changing the capacitance 96 or 102. The effective value of the capacitances can be changed by introducing or withdrawing additional flow from them such as by tube 93.

By connecting tube 93 to both capacitances 96 and 103, the time to switch back and forth is altered in equal amounts. Thus, the frequency is changed proportionate to the flow introduced or withdrawn from the tube 93 and the device produces a frequency proportionate to the fluid flow through tube 93.

The operation of the oscillator in FIG. 5 is similar to the operation of the oscillator in FIG. 1. In the embodiment of FIG. 5, the proportional signals are introduced in controls 114 and 115 directly into the separation bubble. The separation bubble and the input connectors serve as capacitances to shape the input signals. The modulated output produced in channels 118 and 119 is proportional to the difference in the signals introduced in controls 114 and 115.

It will be apparent that the embodiments shown are only exemplary and that various modifications can be made in construction and arrangement within the scope of the invention as defined in the appended claims.

We claim as our invention:

1. A pure fluid pulse width modulation system comprising:

(a) a bistable fluid amplifier;

(b) means for supplying regular periodic fluid signals to the controls of said amplifier to produce a constant frequency digital pulse output of said amplifier;

(c) means for applying fluid analog control signals to said amplifier;

(d) said analog control signals being combined with said periodic signals to provide pulse width modulation of said constant frequency digital output, whereby;

(e) said modulation is proportional to said analog control signals.

2. The pure fluid pulse width modulation system according to claim 1, wherein:

(a) said fluid analog control signals are introduced into the interaction chamber of said amplifier immediately downstream of said controls into the separation bubble formed by the power stream of said amplifier on each lock-on side, whereby;

(b) said separation bubble on each lock-on side serves as a capacitance to shape said analog signals.

3. The pure fluid pulse width modulation system according to claim 2, wherein said means for supplying said fluid signals to the control of said amplifier comprises a fluid delay loop interconnecting said controls of said amplifier whereby fluid signals are carried from one control to another to produce said constant frequency output.

4. The pure fluid pulse width modulation system according to claim 1, wherein said means for supplying said fluid signals to the controls of said amplifier comprises a pure fluid oscillator having a pair of outputs.

5. The pure fluid pulse width modulator according to claim 4, wherein:

(a) the outputs of said oscillator are connected to said controls of said bistable amplifier; and (b) said analog control signals are introduced directly into said controls of said amplifier.

6. The pure fluid pulse width modulator according to claim 5, wherein said oscillator is a bistable fluid amplifier having its controls connected to each other by means of a fluid delay loop whereby fluid waves are carried from one control to the other to produce said constant frequency output.

7. The pure fluid pulse width modulator according to claim 4, wherein:

(a) said outputs of said oscillator are capacitively coupled to said controls of said bistable amplifier through fluid tank means; and (b) said fluid analog control signals are introduced into said tank means, whereby (c) said analog signals change the filling and emptying time of said tank means.

8. The pure fluid pulse width modulator according to claim 7, wherein:

(a) said analog signals are amplified by means of a proportional fluid amplifier before being introduced into said tank means; and (b) said tank means having adjustable bleed means for varying the effective capacitance of said tank means.

9. The pure fluid pulse width modulator according to claim 7, wherein:

(a) a fluid buffer amplifier is connected between said oscillator outputs and said tank means; whereby (b) the frequency of oscillation of said oscillator remains constant as the flow in said tank means is varied by said analog signals.

10. The pure fluid pulse width modulator according to claim 8, wherein said oscillator is an open end organ pipe oscillator.

11. The pure fluid pulse width modulator according to claim 9, wherein said oscillator is a closed end organ pipe oscillator having a central bleed aperture.

References Cited by the Examiner

UNITED STATES PATENTS

| | | | |
|---|---|---|---|
| 3,158,166 | 11/1964 | Warren | 137—81.5 |
| 3,159,168 | 12/1964 | Reader | 137—81.5 |

M. CARY NELSON, *Primary Examiner.*

LAVERNE D. GIEGER, *Examiner.*

W. R. CLINE, *Assistant Examiner.*